United States Patent
Han et al.

(10) Patent No.: US 8,341,402 B2
(45) Date of Patent: Dec. 25, 2012

(54) METHOD OF CONTROLLING CONTENT ACCESS AND METHOD OF OBTAINING CONTENT KEY USING THE SAME

(75) Inventors: Sung-hyu Han, Seoul (KR);
Myung-sun Kim, Uiwang-si (KR);
Young-sun Yoon, Suwon-si (KR);
Sun-nam Lee, Suwon-si (KR);
Bong-seon Kim, Seognam-si (KR);
Jae-heung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1331 days.

(21) Appl. No.: 11/300,485

(22) Filed: Dec. 15, 2005

(65) Prior Publication Data
US 2006/0179478 A1 Aug. 10, 2006

Related U.S. Application Data

(60) Provisional application No. 60/644,583, filed on Jan. 19, 2005.

(30) Foreign Application Priority Data
Feb. 5, 2005 (KR) .................. 10-2005-0011017

(51) Int. Cl.
*G06F 21/00* (2006.01)
(52) U.S. Cl. ............... 713/163; 713/166; 726/4; 726/21
(58) Field of Classification Search .................. 713/166
See application file for complete search history.

(56) References Cited

U.S. PATENT DOCUMENTS

| | | | | |
|---|---|---|---|---|
| 4,531,020 | A * | 7/1985 | Wechselberger et al. | 380/239 |
| 5,708,812 | A * | 1/1998 | Van Dyke et al. | 717/171 |
| 5,941,956 | A * | 8/1999 | Shirakihara et al. | 709/245 |
| 6,131,160 | A * | 10/2000 | Dillon et al. | 713/162 |
| 7,074,183 | B2 * | 7/2006 | Castellanos | 600/300 |
| 2002/0123968 | A1 | 9/2002 | Okayama et al. | |
| 2003/0046565 | A1 | 3/2003 | Morino | |
| 2003/0061519 | A1 * | 3/2003 | Shibata et al. | 713/202 |

FOREIGN PATENT DOCUMENTS

| | | |
|---|---|---|
| EP | 1 120 715 A1 | 8/2001 |
| JP | 2003-196161 A | 7/2003 |
| JP | 2005-6033 A | 1/2005 |

* cited by examiner

*Primary Examiner* — Gilberto Barron, Jr.
*Assistant Examiner* — Devin Almeida
(74) *Attorney, Agent, or Firm* — Sughrue Mion, PLLC

(57) ABSTRACT

Provided is a method of controlling content access in a home network. The method includes: (a) defining a predetermined sub group and allocating a sub group key for the sub group; and (b) checking whether a user belongs to the sub group and transmitting the sub group key to a user device requested by the user, wherein the user device obtains an encrypted content key using a domain key and the sub group key. Since a content key is twice encrypted using a domain key and a sub group key and transmitted to a user device, it is possible to provide authorized content access to a user.

8 Claims, 6 Drawing Sheets

METHOD OF CONTROLLING CONTENT ACCESS AND METHOD OF OBTAINING CONTENT KEY USING THE SAME

This application claims the benefit of U.S. Patent Provisional Application No. 60/644,583, filed on Jan. 19, 2005, in the U.S. Patent and Trademark Office, and Korean Patent Application No. 10-2005-0011017, filed on Feb. 5, 2005, in the Korean Intellectual Property Office, the disclosures of which are incorporated herein in their entirety by reference.

BACKGROUND OF THE INVENTION

1. Field of the Invention

The present invention relates to a method of controlling content access, and more particularly to, a method of controlling content access by forming a user group and providing an authorized content access to the user group.

2. Description of the Related Art

FIG. 1A is a diagram illustrating a structure of a home network. Referring to FIG. 1A, the home network comprises a home server and user devices. The home server receives contents from an external source and administers domains or contents of the user devices. The home server administers a join and a leave of the user devices to and from domains of the user devices, and prevents an unauthorized user from obtaining contents by encrypting the contents.

A user inputs a command to the home server, the home server receives the command and transmits a reproduction command to the user devices, and the user devices reproduce contents according to the reproduction command.

FIG. 1B is a block diagram illustrating a conventional method of controlling content access. Referring to FIG. 1B, a home server encrypts contents using a content key to generate encrypted contents. The home server encrypts the content key using a domain key to generate an encrypted content key. The domain key is transmitted to a user device that belongs to a domain of a home network according to a domain management. Then, the contents and the content keys, encrypted at the request of a user, are transmitted to user devices.

User devices decrypt the encrypted content keys using the domain keys to obtain the content keys and decrypt the encrypted contents using the content keys to obtain the contents.

However, such a conventional method of controlling content access cannot provide an authorized content access to an individual user. For example, it is impossible to control content access by dividing all members of a family into a major group and a minor group and authorizing the major group to reproduce contents that are not allowed for the minor group.

SUMMARY OF THE INVENTION

The present invention provides a method of controlling content access by forming a group including members of a home network and providing authorized content access to the group.

According to an aspect of the present invention, there is provided a method of controlling content access in a home network.

According to another aspect of the present invention, there is provided a method of obtaining a content key by a user device in a home network.

According to still another aspect of the present invention, there is provided a method of obtaining a content key by a user device in a home network, wherein an encrypted content key is generated by encrypting a content key twice using a domain key and a sub group key.

According to yet another aspect of the present invention, there is provided a method of controlling content access in a home network, comprising: defining a predetermined sub group and allocating a generator and sub group public information to the sub group; generating a sub group key of the sub group using a supervisor password; generating an authentication function value using a supervisor password (PW1) and a user password; and transmitting the authentication function value and sub group public information to a user device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings.

Figure 1A:
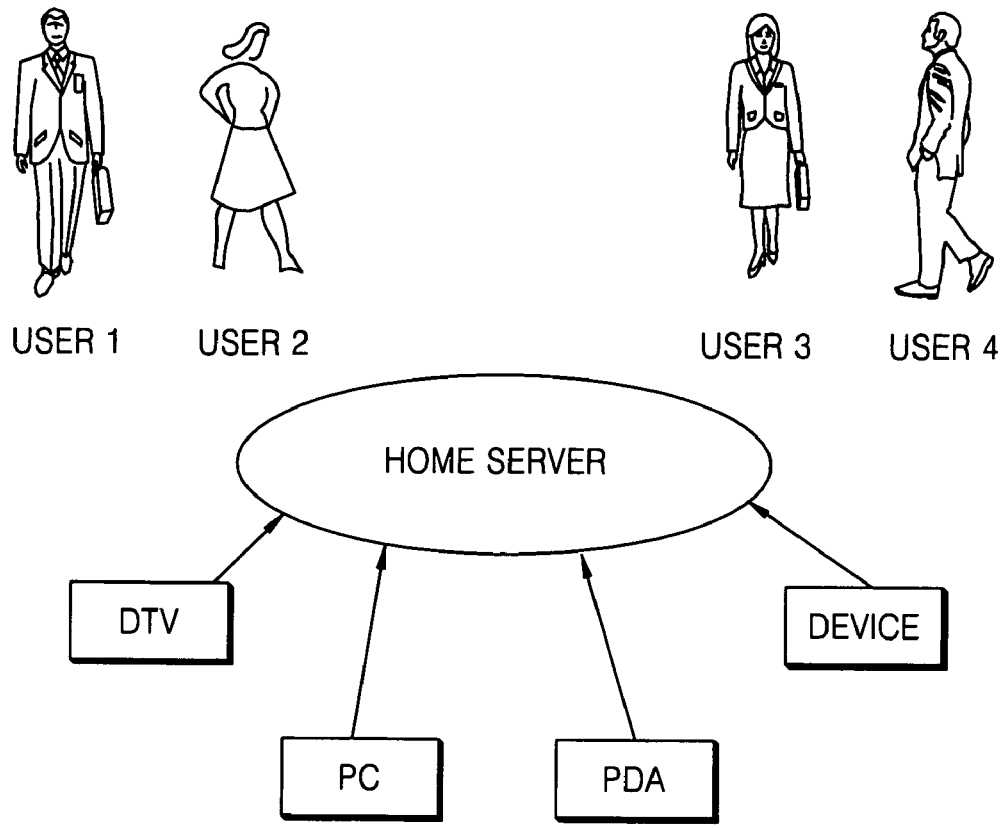
FIG. 1A is a diagram illustrating a structure of a home network.
Figure 1B:
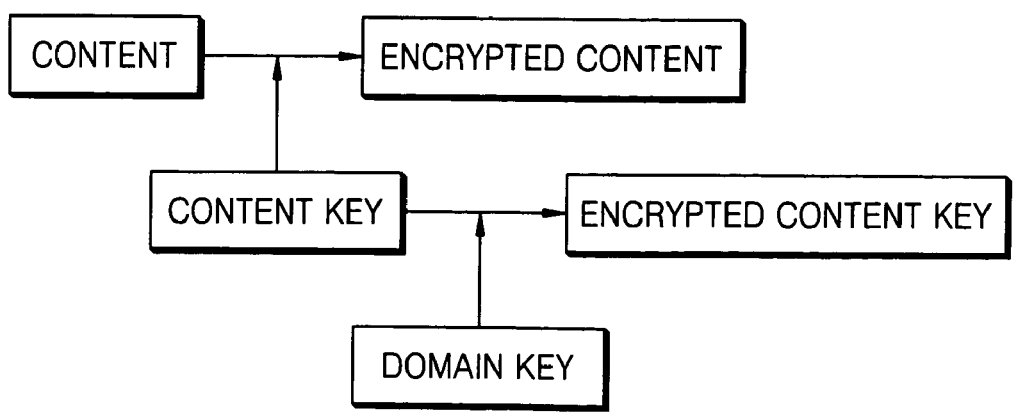
FIG. 1B is a block diagram illustrating a conventional method of controlling an content access.
Figure 2:
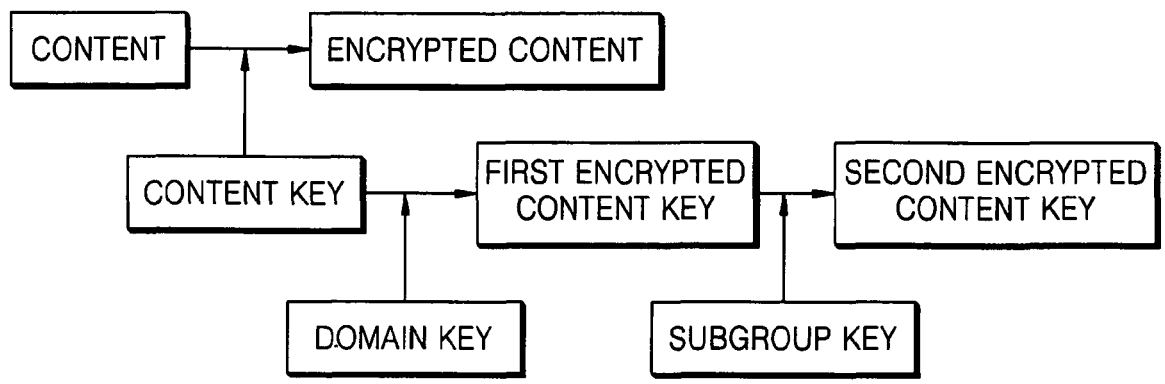
FIG. 2 is a block diagram illustrating a method of controlling content access according to an embodiment of the present invention.
Figure 5:
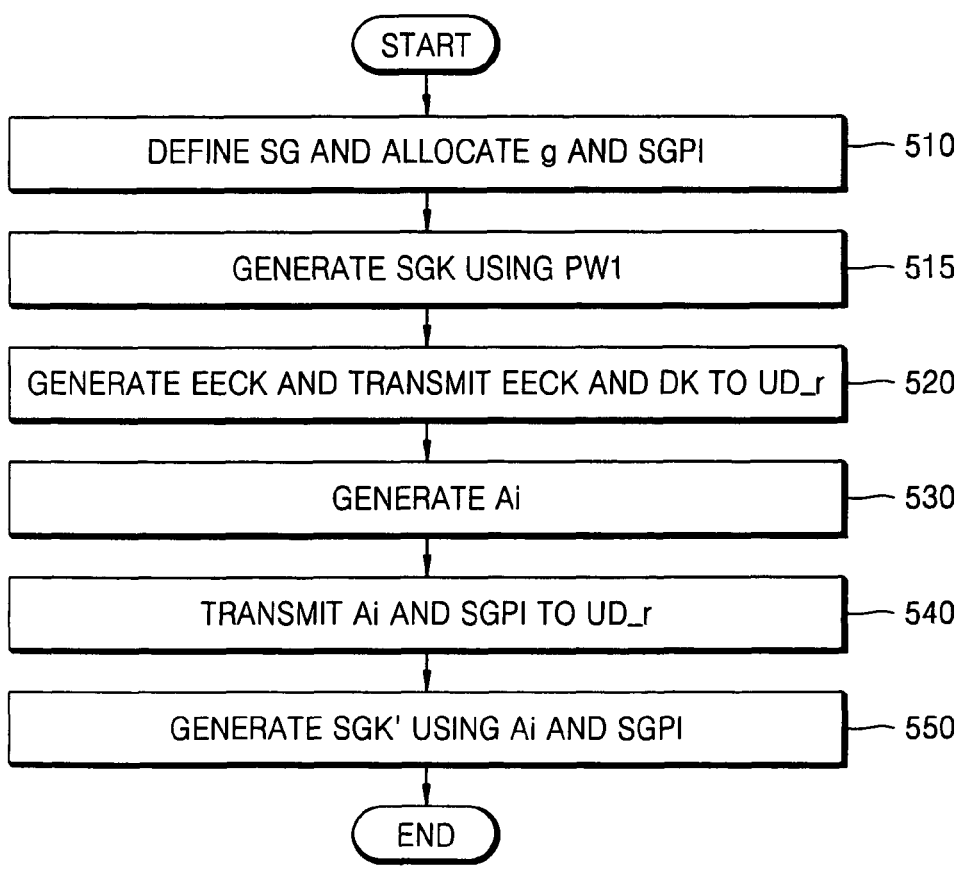
FIG. 5 is a flowchart illustrating a method of controlling content access in a home domain according to another embodiment of the present invention.
Figure 6:
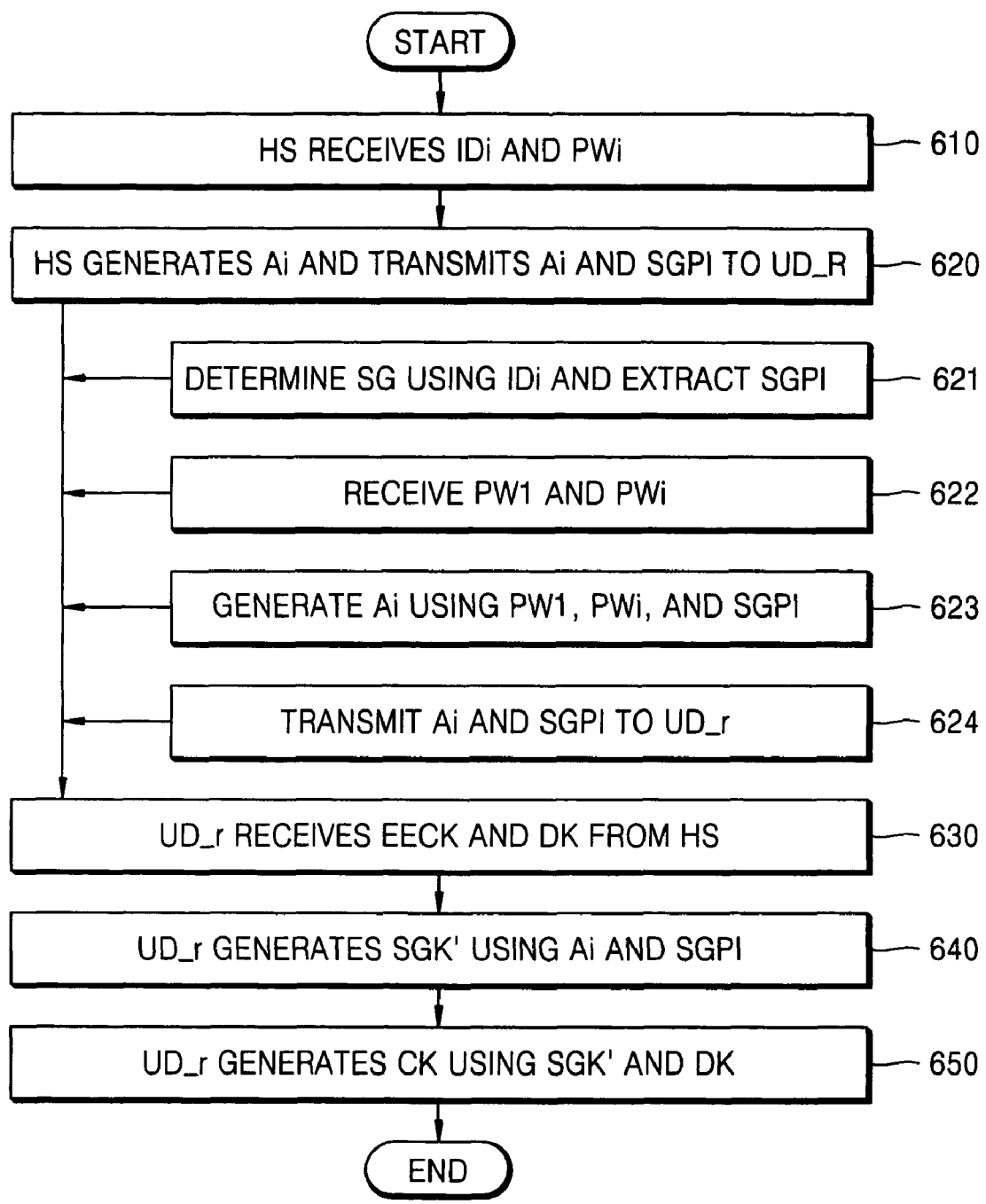
FIG. 6 is a flowchart illustrating a method of obtaining a content key by a user device using the method shown in FIG. 5.
Figure 7:
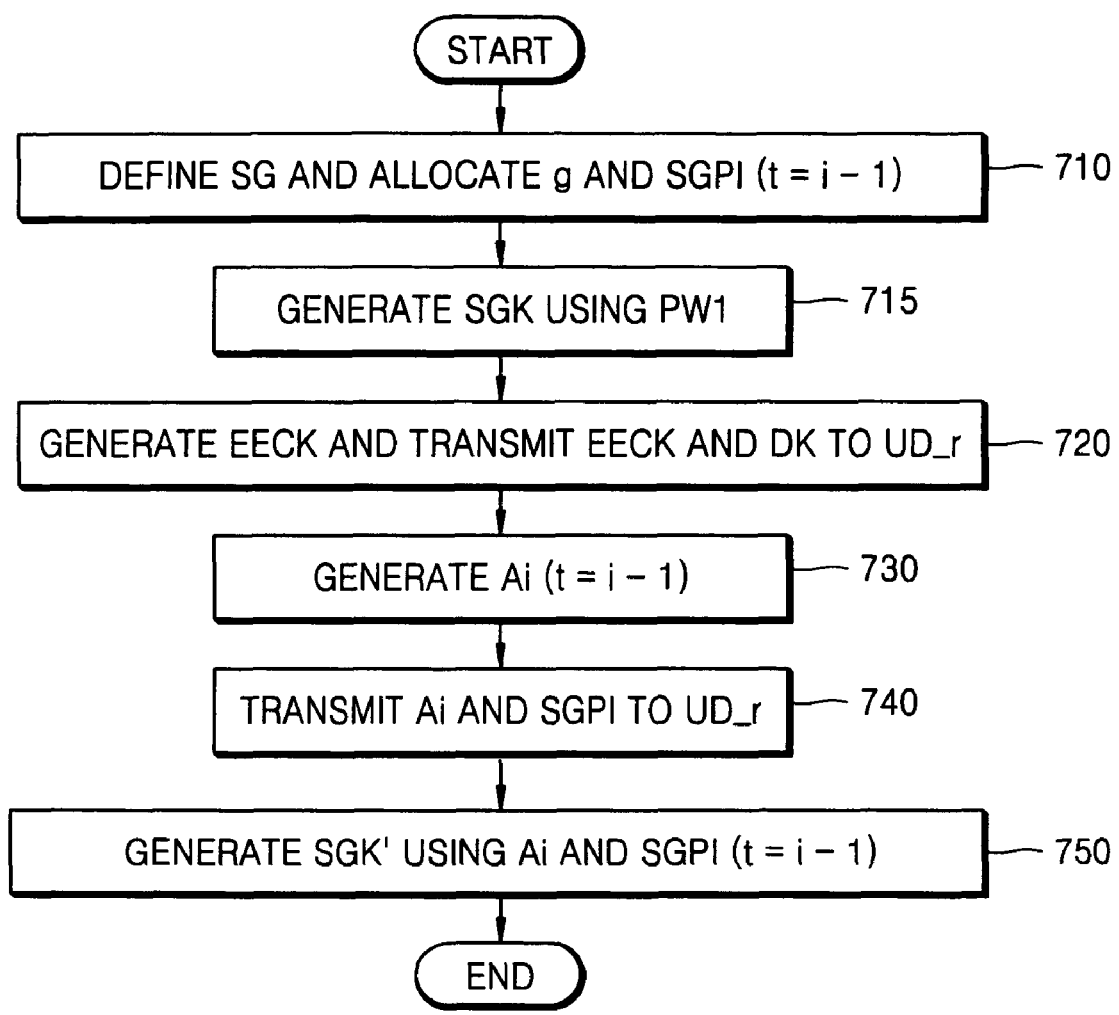
FIG. 7 is a flowchart illustrating a method of controlling content access in a home domain according to another embodiment of the present invention.

FIG. 2 is a block diagram illustrating a method of controlling content access according to an embodiment of the present invention. Referring to FIG. 2, a home server encrypts contents using a content key to generate encrypted contents. The home server encrypts the content key using a domain key to generate a first encrypted content key and encrypts the first encrypted content key using a sub group key to generate a second encrypted content key. Similar to the conventional method of FIG. 1B, the domain key is transmitted to a user device that belongs to a domain of a home network according to a domain management. The contents and the second content key encrypted at the request of a user are transmitted to user devices, respectively. The sub group key is generated by the home server and transmitted to a user device (FIGS. 3 and 4) or generated in a user device using information provided by the home server (FIGS. 5, 6, and 7). In this case, the first encrypted content key is not transmitted to a user device.

The user device decrypts the second encrypted content key using the sub group key to obtain the first encrypted content key and decrypts the first encrypted content key using the domain key to obtain the content key.

Figure 3:
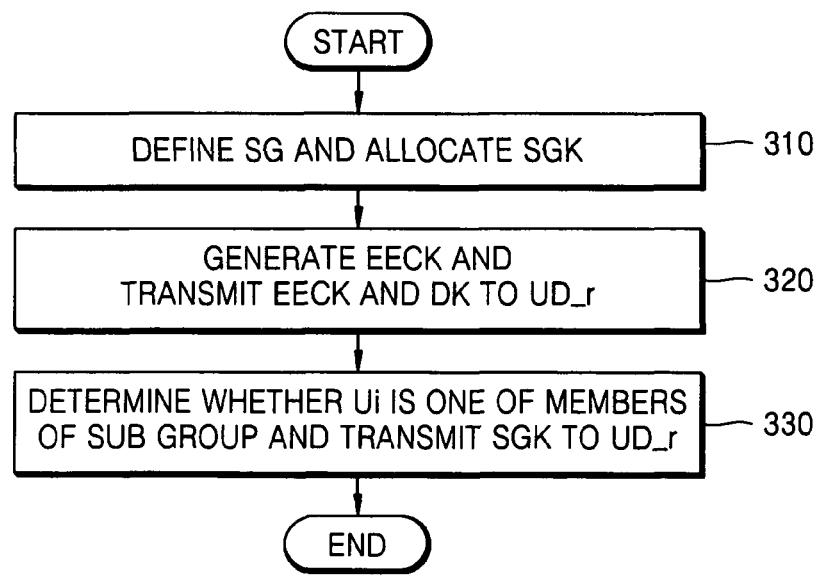
FIG. 3 is a flowchart illustrating a method of controlling content access in a home domain according to another embodiment of the present invention.

FIG. 3 is a flowchart illustrating a method of controlling content access in a home domain according to an embodiment of the present invention. Referring to FIG. 3, a home server HS defines a sub group SG that contains a user identifier ID and a user password PW of a user who belongs to a sub group and allocates a predetermined sub group key SGK to the sub group SG (Operation 310).

Sub group information SGI that contains the user identifier ID, the user password PW and the sub group key SGK is stored in the home server HS.

The home server HS encrypts a content key CK using a domain key DK to generate a first encrypted content key ECK, encrypts the first encrypted content key ECK using the sub group key SGK allocated in Operation 310 to generate a second encrypted content key EECK, and transmits the second encrypted content key EECK and the domain key DK to the user device UD_r (Operation 320). A user device UD_r indicates a user device requested to reproduce contents by the user Ui. A user Ui indicates a random user among members of a home network who requests to reproduce contents. The first encrypted content key ECK is not transmitted to the user device UD_r.

The domain key DK is a domain key allocated to a domain of the home server HS and can be obtained by all of authorized user devices in the domain. The content key CK is used to decrypt predetermined encrypted contents.

The home server HS receives the user identifier ID and the user password PW from the user Ui, determines if the user Ui is one of the members of the sub group SG using the received user identifier ID and the user password PW, and transmits the sub group key SGK of the sub group SG to the user device UD_r that is requested to reproduce contents by the user Ui when it is determined that the user Ui is one of members of the sub group SG (Operation 330).

According to the method shown in FIG. 3, since the user device UD_r that belongs to the home server HS cannot obtain the first encrypted content key ECK but only the second encrypted content key EECK and the domain key DK, it cannot obtain the content key CK. To be more specific, the user device UD_r can obtain the content key CK using the sub group key SGK only obtained from the home server HS when it is determined that a user who requests the sub group key SGK belongs to the sub group SG. A user can obtain a sub group key of a sub group to which the user belongs, which restricts contents to be reproduced in the sub group to which the user belongs.

In another embodiment, the home server HS includes a sub group identifier ID_sg that identifies sub groups, a user identifier ID that identifies users who belong to sub groups, and a sub group table SGT that contains a user password PW. The user password PW is hashed and stored in the home server HS. There may be more than one user device UD_r.

Figure 4:
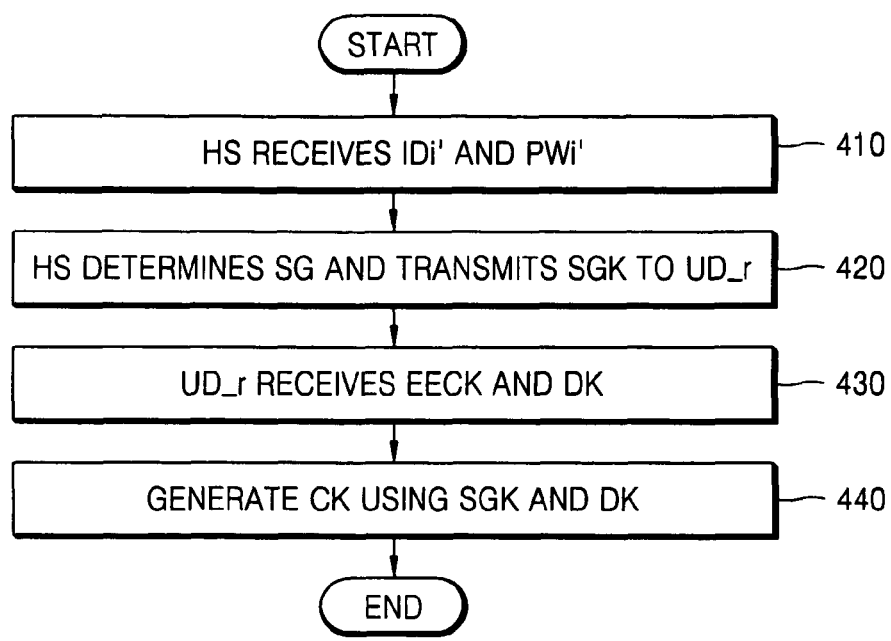
FIG. 4 is a flowchart illustrating a method of obtaining a content key by a user device using the method shown in FIG. 3.

FIG. 4 is a flowchart illustrating a method of obtaining a content key by a user device using the method shown in FIG. 3. Referring to FIG. 4, a home server HS receives a user identifier IDi' and a user password PWi' from a user Ui (Operation 410).

The home server HS determines a sub group SG to which the user Ui belongs using the user identifier IDi' and the user password PWi' received in Operation 410 and transmits a sub group key SGK of the determined sub group SG to the user device UD_r (Operation 420). The user Ui requests the user device UD_r to reproduce contents.

To be more specific, the home server HS determines whether the user identifier IDi' and the user password PWi' received in Operation 410 are equal to a user identifier IDi and a user password PWi in the sub group information SGI, extracts the sub group key SGK of the sub group from the sub group information SGI and transmits the extracted sub group key SGK to the user device UD_r when they are determined to be equal to each other.

The user device UD_r receives the second encrypted content key EECK and the domain key DK from the home server HS (Operation 430).

The second encrypted content key EECK is generated by the home server HS by encrypting the first encrypted content key ECK using the sub group key SGK. The first encrypted content key ECK is generated by the home server HS by encrypting the content key CK using the domain key DK.

The domain key DK can be obtained by the user device UD_r which belongs to the home server HS. The method of obtaining the domain key DK by the user device UD_r is widely known to those skilled in the art.

The user device UD_r decrypts the second encrypted content key EECK received in Operation 430 using the sub group key SGK received in Operation 420 to generate the first encrypted content key ECK and decrypts the first encrypted content key ECK using the domain key DK received in Operation 430 to generate the content key CK (Operation 440).

According to the method shown in FIG. 4, since the user device UD_r can receive a sub group key SGK of a sub group to which the user Ui belongs and the user Ui can obtain a content key CK only using the sub group key SGK received by the user device UD_r, the user Ui is restricted to accessing contents produced by the user device UD_r.

For example, when a minor user U2 belongs to sub groups SG1 and SG2, and the sub groups SG1 and SG2 have sub group keys SGK1 and SGK2, respectively, a content key CK_adult is used to encrypt contents Cont_adult that is not allowed to minors and encrypted using the domain key DK to generate a first encrypted content key ECK_adult, the encrypted content key ECK_adult is encrypted using a sub group key SGK5 to generate a second encrypted content key EECK_adult. In this case, since the minor user U2 can obtain the sub group keys SGK1 and SGK2, it cannot obtain the content key CK_adult, whereas users who belong to a sub group SG5 can obtain the content key CK_adult.

FIG. 5 is a flowchart illustrating a method of controlling content access in a home domain according to an embodiment of the present invention. Referring to FIG. 5, a home server HS defines a sub group SG that contains a user identifier ID of a user who belongs to a sub group and allocates a generator g and sub group public information SGPI to the sub group SG (Operation 510).

Sub group information SGI that contains the user identifier ID, the generator g and the sub group public information SGPI is stored in the home server HS. The sub group public information SGPI is given by Equation 1, $$SGPI = \{x \mid x = g^{h^j(PW1)}, (1 D j D t)\} = \qquad (1)$$
$$\{x_1, x_2, \ldots, x_t\} = \{g^{h^1(PW1)}, g^{h^2(PW1)}, \ldots, g^{h^t(PW1)}\}$$

wherein, PW1 denotes a supervisor password, g denotes a generator, h( ) denotes a hash function, t denotes a random number, and h^j( ) denotes j times hash repetition. For example, h^3(x)=h(h(h(x))). t is a random number. The supervisor is one of users U1, U2, . . . Uk. In Equation 1, the supervisor is the user U1 and t is related to the number of participants, which will be described later.

The home server HS generates a sub group key SGK using the supervisor password PW1 (Operation 515). The sub group key SGK is given by Equation 2.

$$SGK = g^{(PW1)} \quad (2)$$

The home server HS encrypts a content key CK using a domain key DK to generate a first encrypted content key ECK, encrypts the first encrypted content key ECK using the sub group key SGK generated in Operation 515 to generate a second encrypted content key EECK, and transmits the second encrypted content key EECK and the domain key DK to a user device UD_r (Operation 520).

The first encrypted content key ECK is not transmitted to the user device UD_r. The sub group key SGK is not stored in the home server HS.

The home server HS receives a user identifier IDi and the user password PWi from the user Ui and generates an authentication function value Ai using the supervisor password PW1 and the user password PWi of the user Ui (Operation 530). The authentication function value Ai is given by Equation 3, $$Ai = PW1 - \underset{j=1}{\overset{t}{Q}} [h^j(PW1) * (PWi)^j] \bmod |G| \quad (3)$$

wherein, Ai denotes an authentication function value of the user Ui, PW1 denotes a supervisor password, PWi denotes a user password of the user Ui, t denotes a random number, and G denotes a generation group of the generator g.

For example, when t=2, an authentication function value A3 of user U3 is given by Equation 4.

$$A3 = PW1 - \underset{j=1}{\overset{2}{Q}} [h^j(PW1) * (PW3)^j] \bmod |G| = \\ PW1 - [h(PW1)*(PW3) + h^2(PW1)*(PW3)^2] \bmod |G| \quad (4)$$

The home server HS transmits the authentication function value Ai generated in Operation 530 and sub group public information SGPI of a sub group that belongs to a user identifier IDi' to the user device UD_r (Operation 540).

The user device UD_r generates a sub group key SGK' using the authentication function value Ai and the sub group public information SGPI. The sub group key SGK' is given by Equation 5.

$$SGK' = g^{Ai} * \underset{j=1}{\overset{t}{O}} \left[ \left( g^{h^j(PW1)} \right)^{(PWi)^j} \right] \quad (5)$$

The sub group key SGK' is identical to the sub group key SGK of Equation 2, which is proven by Equation 6.

$$SGK' = g^{Ai} * \underset{j=1}{\overset{t}{O}} \left[ \left( g^{h^j(PW1)} \right)^{(PWi)^j} \right] = \quad (6)$$

$$g^{PW1 - \underset{j=1}{\overset{t}{Q}} [h^j(PW1)*(PWi)^j]} * \underset{j=1}{\overset{t}{O}} \left[ \left( g^{h^j(PW1)} \right)^{(PWi)^j} \right] =$$

$$g^{PW1 - \underset{j=1}{\overset{t}{Q}} [h^j(PW1)*(PWi)^j]} * g^{\underset{j=1}{\overset{t}{Q}} h^j(PW1)*(PWi)^j} = g^{PW1} = SGK$$

t, given in Equations 1 through 6, is randomly selected and is related to the number of participants. The participants are users who inform each other about their own user password PWi and the received sub group public information SGPI. According to Equation 3, when t=1, the supervisor password PW1 can be obtained and thus the method shown in FIG. 5 does not guarantee the security of a system. The system is safer as t increases. However, a greater t increases the number of operations that have to be performed. Thus, t may increase only in accordance with the operational capacity of an apparatus using the method shown in FIG. 3.

According to the method shown in FIG. 5, the home server HS does not store the sub group key SGK and the supervisor password PW1 therein. Since an unauthorized user who hacks the home server HS cannot obtain the sub group key SGK and the supervisor password PW1, the method shown in FIG. 5 is safer than the method shown in FIG. 3.

FIG. 6 is a flowchart illustrating a method of obtaining a content key by a user device using the method shown in FIG. 5. Referring to FIG. 6, a home server HS receives a user identifier IDi and the user password PWi from a user Ui (Operation 610).

The home server HS generates an authentication function value Ai using the supervisor password PW1, a user password PWi of the user Ui, and sub group public information SGPI of a sub group to which the user Ui belongs and transmits the authentication function value Ai and the sub group public information SGPI to a user device UD_r (Operation 620). Operation 620 is divided into Operations 621 through 624.

The home server HS determines the sub group SG to which the user Ui belongs using the user identifier IDi and extracts sub group public information SGPI from sub group information SGI of the determined sub group SG (Operation 621).

The home server HS receives the supervisor password PW1 and the password PWi from the supervisor and the user Ui, respectively (Operation 622).

The home server HS generates the authentication function value Ai using supervisor password PW1, the user password PWi of the user Ui, and the sub group public information SGPI extracted in Operation 621 (Operation 623). The authentication function value Ai is given by Equation 3 above.

The home server HS transmits the authentication function value Ai generated in Operation 623 and the sub group public information SGPI extracted in Operation 621 to the user device UD_r (Operation 624). The user device UD_r is requested by the user Ui to reproduce contents.

The user device UD_r receives a second encrypted content key EECK and a domain key DK from the home server HS (Operation 630).

The second encrypted content key EECK is generated by the home server HS by encrypting a first encrypted content key ECK using a sub group key SGK. The first encrypted content key ECK is generated by the home server HS by encrypting the content key CK using the domain key DK. The sub group key SGK is generated by the home server HS which is given by Equation 2 above.

The user device UD_r generates a sub group key SGK' using the authentication function value Ai and the sub group public information SGPI transmitted in Operation 620 (Operation 640).

In the authentication function value Ai given by Equation 3, the sub group key SGK' is given by Equation 5 above. According to Equation 6, the sub group key SGK generated by the home server HS is identical to the sub group key SGK' generated by the user device UD_r.

The user device UD_r decrypts the second encrypted content key EECK received in Operation 630 using the sub group key SGK' generated in Operation 640 to generate the first encrypted content key ECK and decrypts the first encrypted content key ECK using the domain key DK received in Operation 630 to generate the content key CK.

According to the method shown in FIG. 6, since the user device UD_r can generate the sub group key SGK of the sub group to which the user Ui belongs, and the user Ui can obtain the content key CK only using the sub group key SGK, the user Ui is restricted to accessing contents produced by the user device UD_r.

According to the method shown in FIG. 6, the home server HS does not store the sub group key SGK and the supervisor password PW1 therein. Since an unauthorized user who hacks the home server HS cannot obtain the sub group key SGK and the supervisor password PW1, the method shown in FIG. 6 is safer than the method shown in FIG. 4.

FIG. 7 is a flowchart illustrating a method of controlling content access in a home domain according to an embodiment of the present invention. The method shown in FIG. 7 is identical to the method shown in FIG. 5 except that t is not a random number, rather t=i−1, where i−1 is a user serial number. Referring to FIG. 7, a home server HS defines a sub group SG that contains a user identifier ID of a user who belongs to a sub group and allocates a generator g and sub group public information SGPI to the sub group SG (Operation 710).

Sub group information SGI that contains the user identifier ID, the generator g and the sub group public information SGPI is stored in the home server HS. The sub group public information SGPI is given by Equation 7, $$SGPI = \{x \mid x = g^{h^j(PW1)}, (1 \trianglelefteq j \trianglelefteq i-1)\} = \qquad (7)$$
$$\{x_1, x_2, \ldots, x_t\} = \{g^{h^1(PW1)}, g^{h^2(PW1)}, \ldots, g^{h^{i-1}(PW1)}\}$$

wherein, PW1 denotes a supervisor password, g denotes a generator, h( ) denotes a hash function, t=i−1, and h^j( ) denotes j times hash repetition. For example, h^3(x)=h(h(h(x))). Unlike in FIG. 5, t is not a random number, rather t=i−1. In FIG. 5, t is fixed as a random number, whereas, in FIG. 7, whenever i increases, the sub group public information SGPI is calculated one by one. To be more specific, in a current sub group comprising users U1, U2, and U3, the home server HS generates sub group public information SGPI={g^{h(PW1)}, g^{h^2(PW1)}, g^{h^3(PW1)}}. However, if user U4 is joined to the current sub group, the home server HS generates new sub group public information SGPI=g^{h^4(PW1)}, thereby the entire sub group public information SGPI={g^{h(PW1)}, g^{h^2(PW1)}, g^{h^3(PW1)}, g^{h^4(PW1)}}.

The home server HS generates a sub group key SGK using the supervisor password PW1 (Operation 715). The sub group key SGK is given by Equation 2, which is the same as that of the method shown in FIG. 5.

The home server HS encrypts a content key CK using a domain key DK to generate a first encrypted content key ECK, encrypts the first encrypted content key ECK using the sub group key SGK generated in Operation 715 to generate a second encrypted content key EECK, and transmits the second encrypted content key EECK and the domain key DK to a user device UD_r (Operation 720).

Like the method shown in FIG. 5, the first encrypted content key ECK is not transmitted to the user device UD_r, and the sub group key SGK is not stored in the home server HS.

The home server HS receives a user identifier IDi and the user password PWi from a user Ui and generates an authentication function value Ai using the user password PWi of the user Ui (Operation 730). Unlike in the method shown in FIG. 5, the authentication function value Ai is given by Equation 8, $$Ai = PW1 - \overset{i-1}{\underset{j=1}{Q}} [h^j(PW1) * (PWi)^j] \mathrm{mod}|G| \qquad (8)$$

wherein, Ai denotes an authentication function value of the user Ui, PW1 denotes a supervisor password, PWi denotes a user password of the user Ui, t denotes a user serial number, and G denotes a generation group of a generator g.

Unlike the method shown in FIG. 5, t is not a random number, rather t=i−1 in Equation 8. In FIG. 5, t is fixed as a random number, whereas, in FIG. 7, whenever i increases, the sub group public information SGPI is calculated one by one. To be more specific, whenever a new member is joined to a sub group, an authentication function value for the new member is calculated.

For example, when a new user U4 is joined to a current sub group comprising users U1, U2, and U3, the users U1, U2, U3, and U4 receive authentication function values A1, A2, A3, A4, respectively, in the method shown in FIG. 5, which are given by Equation 9. In this case, t is 2.

$$A2 = PW1 - [h(PW1)*(PW2) + h^2(PW1)*(PW2)^2] \mathrm{mod}|G| \qquad (9)$$
$$A3 = PW1 - [h(PW1)*(PW3) + h^2(PW1)*(PW3)^2] \mathrm{mod}|G|$$
$$A4 = PW1 - [h(PW1)*(PW4) + h^2(PW1)*(PW4)^2] \mathrm{mod}|G|$$

Meanwhile, the users U1, U2, U3, and U4 receive authentication function values A1, A2, A3, A4, respectively, in the method shown in FIG. 7, which are given by Equation 10.

$$A2 = PW1 - [h(PW1)*(PW2)] \mathrm{mod}|G| \qquad (10)$$

$$A3 = PW1 - [h(PW1)*(PW3) + h^2(PW1)*(PW3)^2] \mathrm{mod}|G|$$
$$A4 = PW1 - [h(PW1)*(PW4) +$$
$$\qquad h^2(PW1)*(PW4)^2 + h^2(PW1)*(PW4)^2] \mathrm{mod}|G|$$

The home server HS transmits the authentication function value Ai generated in Operation 730 and sub group public information SGPI of a sub group that belongs to a user identifier IDi to the user device UD_r (Operation 740).

The user device UD_r generates a sub group key SGK' using the authentication function value Ai and the sub group public information SGPI (Operation 750). Unlike the method shown in FIG. 5, the sub group key SGK' is given by Equation 11.

$$SGK' = g^{Ai} * \mathop{O}_{j=1}^{i-1}\left[\left(g^{h^j(PW1)}\right)^{(PWi)^j}\right] \quad (11)$$

Equation 11 is different from Equation 5 in that t=i−1. In the method shown in FIG. 5, t is randomly selected and fixed. If the number of the members increases, t must be corrected. However, according to the method shown in FIG. 5, since t is a fixed number, when a new member joins the group the security of the system is jeopardized since t must be updated. In this case, the home server HS must generate a new authentication function value and transmit it to a user device. The user device must generate a sub group key using a new t value.

However, according to the method shown in FIG. 7, since t=i−1, authentication function values received by the users use a t value different from a t value used by another authentication function value (see Equation 10). Therefore, even though the number of the members increases enough to threaten the security of the system, it is not necessary to recalculate the authentication function value or retransmit it to the user device. That is, according to the method shown in FIG. 7, since the t value is not fixed, it is easier to add a new member.

Figure 8:
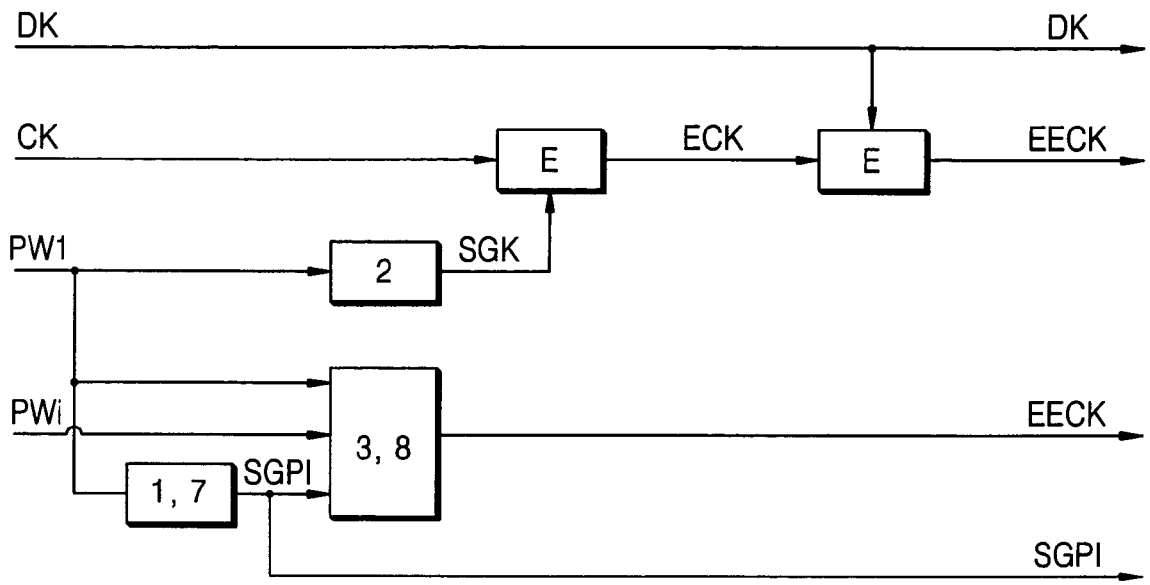
FIG. 8 is a diagram illustrating information processed by a home server used in the methods of FIGS. 5 through 7.

FIG. 8 is a diagram illustrating information processed by a home server used in methods shown in FIGS. 5 through 7. Referring to FIG. 8, E indicates an encryption process and a number in a box indicates a number of an Equation used to process information. A home server generates an authentication function value Ai using a supervisor password, sub group public information and a password PWi of a user Ui and transmits them to a user device.

The home server transmits, instead of an encrypted content key, the authentication function value Ai and the sub group public information to the user device.

Figure 9:
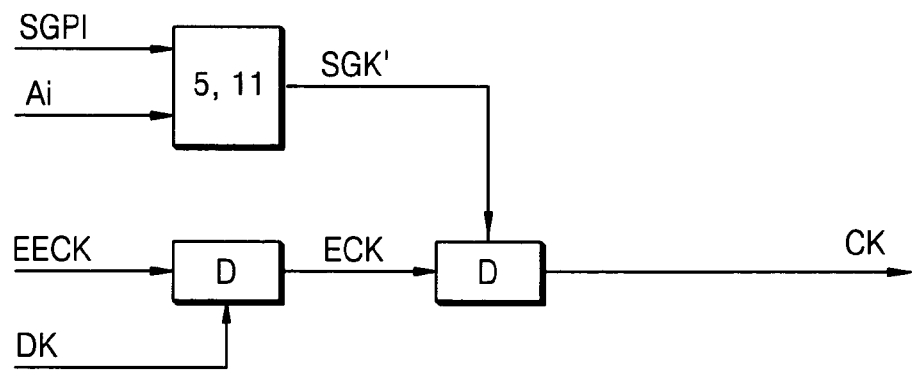
FIG. 9 is a diagram illustrating information processed by a used device used in the methods shown in FIGS. 5 through 7.

FIG. 9 is a diagram illustrating information processed by a user device used in methods shown in FIGS. 5 through 7. Referring to FIG. 9, D indicates a decryption process and a number in a box indicates a number of an Equation used to process information. A user device receives sub group public information SGPI, an authentication function value Ai, a second encrypted content key EECK, and a domain key DK from a home server, generates a sub group key SGK using the sub group public information SGPI and the authentication function value Ai, and obtains a content key CK using the sub group key SGK.

In the method of obtaining a content key shown in FIG. 4, a sub group key is received from a home server, whereas, in the method of obtaining a content key shown in FIG. 6, a user device generates a sub group key.

It is possible for the present invention to be realized by the execution of a computer-readable code on a computer readable recording medium. Computer-readable recording mediums include every kind of recording device that stores computer system-readable data. ROMs, RAMs, CD-ROMs, magnetic tapes, floppy discs, optical data storage, etc. are used as a computer-readable recording medium. Computer-readable code can be realized in the form of a carrier wave (e.g., transmission through the Internet).

According to the present invention, since a content key is twice encrypted using a domain key and a sub group key and transmitted to a user device, it is possible to provide authorized content access to a user.

A sub group key, used to obtain a content key, is not transmitted from a home server to a user device but is generated by the user device using sub group public information and an authentication function value in which the generated sub group key is equal to that generated by the home server. Therefore, the sub group key is safe from being hacked.

While the present invention has been particularly shown and described with reference to exemplary embodiments thereof, it will be understood by those skilled in the art that various changes in form and details detail may be made therein without departing from the spirit and scope of the invention as defined by the appended claims.

What is claimed is:

1. A method of controlling content access in a home network, comprising:
    defining groups in a home domain of the home network based on an attribute of users, where the groups of the home domain in the home network comprise a first sub group of first users among a plurality of users and a second sub group of second users among the plurality of users, wherein all members of a subscriber household form a single home domain;
    allocating by a computer a first sub group key for the first sub group of first users and a second sub group key for the second sub group of second users, where the first sub group key decrypts an encrypted first content key of first contents, the encrypted first content key generated from a domain key encrypting the first content key, the first content key encrypting first contents, and the second sub group key decrypts an encrypted second content key of second contents, the encrypted second content key generated from the domain key encrypting the second content key, the second content key encrypting second contents;
    determining whether a user who requests access to at least one of the first encrypted contents and second encrypted contents belongs to the first sub group or the second sub group; and
    transmitting one of the first sub group key allocated to the first sub group and the second sub group key allocated to the second sub group to a user device requested by the user, based on a result of the determining.

2. The method of claim 1, further comprising:
    encrypting the first content key using the domain key and encrypting the second content key using the domain key;
    encrypting the encrypted first content key using the first sub group key and encrypting the encrypted second content key using the second sub group key; and
    transmitting one of the encrypted first content key encrypted using the first sub group key and the encrypted second content key encrypted using the second sub group key, and the domain key to the user device, based on the allocating.

3. The method of claim 1, wherein the determining comprises:
    receiving a user identifier and a password from the user;
    checking whether the user identifier and the password are identical to a user identifier and a user password within the first sub group or the second sub group; and
    transmitting the first sub group key of the first sub group or the second sub group key of the second sub group to the user device based on a result of the checking.

4. A method of obtaining a content key by a user device in a home network, the method comprising: transmitting, to a home server in the home network that determines one of groups in a home domain of the home network based on an attribute of users, where the groups of the home domain in the home network comprise a first sub group of first users among a plurality of users and a second sub group of second users among the plurality of users to which a user of the user device belongs, a request to access at least one of first encrypted contents and second encrypted contents, the request comprising a user identifier and a user password that indicate the one of the first sub group and the second sub group to which user belongs, wherein all members of a subscriber household form a single home domain;

receiving one of a first sub group key allocated to the first sub group and a second sub group key allocated to the second sub group, and a domain key, from the home server of the home network, the first sub group key decrypting an encrypted first content key of first contents, the encrypted first content key generated from the domain key encrypting the first content key, the first content key encrypting the first contents, and the second sub group key decrypting an encrypted second content key of second contents, the encrypted second content key generated from the domain key encrypting the second content key, the second content key encrypting the second contents; and decrypting the at least one of the first encrypted contents and the second encrypted contents using the received domain key and the received one of the first sub group key and the second sub group key.

5. A non-transitory computer-readable storage medium having embodied thereon a computer program for executing the method of claim 1.

6. The method of claim 1, wherein the computer is a home server that stores sub group information of the first sub group and the second sub group, each of the sub group information comprising a sub group identifier, a sub group key, a user identifier that identifies each of the users in the sub group and a sub group table comprising a user password for each of the users and wherein the first sub group and the second sub group only comprises users of the same domain.

7. The method of claim 1, wherein the first contents and the second contents are a same contents.

8. The method of claim 1, wherein the attribute of users comprises user age and relates to access rights of the users to view the first or second contents.

\* \* \* \* \*